United States Patent
Iizuka

(10) Patent No.: US 12,444,253 B2
(45) Date of Patent: Oct. 14, 2025

(54) AIR PRESSURE MANAGEMENT DEVICE, AIR PRESSURE MANAGEMENT METHOD, AND AIR PRESSURE MANAGEMENT PROGRAM

(71) Applicant: The Yokohama Rubber Co., LTD., Tokyo (JP)

(72) Inventor: Hiroshi Iizuka, Kanagawa (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 242 days.

(21) Appl. No.: 18/041,638

(22) PCT Filed: Aug. 17, 2021

(86) PCT No.: PCT/JP2021/029970
§ 371 (c)(1),
(2) Date: Feb. 14, 2023

(87) PCT Pub. No.: WO2022/039137
PCT Pub. Date: Feb. 24, 2022

(65) Prior Publication Data
US 2023/0351824 A1    Nov. 2, 2023

(30) Foreign Application Priority Data
Aug. 20, 2020  (JP) .................. 2020-139619

(51) Int. Cl.
*G07C 5/10* (2006.01)
*B60C 23/04* (2006.01)
(Continued)

(52) U.S. Cl.
CPC ............. *G07C 5/10* (2013.01); *G07C 5/0808* (2013.01); *B60C 23/04* (2013.01); *B60C 23/20* (2013.01)

(58) Field of Classification Search
CPC ........ G07C 5/0808; G07C 5/10; B60C 23/04; B60C 23/0476; B60C 23/20
(Continued)

(56) References Cited

U.S. PATENT DOCUMENTS 6,445,286 B1    9/2002  Kessler et al.
11,090,986 B1 *  8/2021  Lerner ................... G01L 17/00
(Continued)

FOREIGN PATENT DOCUMENTS

CA    3067736 A1 * 12/2018 ......... B60C 23/0493
CA    2980666 C  * 12/2023 ............. B60C 23/20
(Continued)

OTHER PUBLICATIONS

Zhou, et al., "An application of multi-sensor information fusion in Tire Pressure Monitoring System," 2010 IEEE International Conference on Intelligent Systems and Knowledge Engineering, Hangzhou, 2010, pp. 187-190, doi: 10.1109/ISKE.2010.5680820. (https://ieeexplore.ieee.org/document/5680820) (Year: 2010).*
(Continued)

*Primary Examiner* — Atul Trivedi
(74) *Attorney, Agent, or Firm* — Thorpe North & Western

(57) ABSTRACT

An air pressure management device includes: a temperature conversion air pressure calculation unit that calculates a temperature conversion air pressure based on acquired temperature and air pressure of a tire; an air pressure decrease rate calculation unit that calculates an air pressure decrease rate from a change in the temperature conversion air pressure for a predetermined period, the rate indicating a declining trend of the air pressure; an air pressure decrease rate threshold value setting unit that sets an air pressure decrease rate threshold value corresponding to an acquired thermal history amount using a threshold value table, the threshold value table specifying the air pressure decrease rate thresh-
(Continued)

old value associated with the thermal history amount regarding the tire; and a first determination unit that determines whether the air pressure is abnormal based on the calculated air pressure decrease rate and the set air pressure decrease rate threshold value.

12 Claims, 9 Drawing Sheets

(51) Int. Cl.
*B60C 23/20* (2006.01)
*G07C 5/08* (2006.01)

(58) Field of Classification Search
USPC .................................................... 701/31.9
See application file for complete search history.

(56) References Cited

U.S. PATENT DOCUMENTS

| | | | |
|---|---|---|---|
| 11,179,977 B2 * | 11/2021 | Horikoshi | B60C 23/0477 |
| 2003/0074961 A1 | 4/2003 | Fischer et al. | |
| 2004/0017289 A1 | 1/2004 | Brown, Jr. | |
| 2006/0010961 A1 | 1/2006 | Gibson et al. | |
| 2012/0044064 A1 | 2/2012 | Maekawa et al. | |
| 2013/0274988 A1 | 10/2013 | Reynes | |
| 2015/0101701 A1 * | 4/2015 | Dean | B60C 23/00372 141/83 |
| 2015/0101702 A1 * | 4/2015 | Dean | B60C 23/00372 141/4 |
| 2015/0239307 A1 * | 8/2015 | Horikoshi | B60C 23/0477 340/442 |
| 2019/0375254 A1 * | 12/2019 | Steiner | B60C 23/0488 |
| 2020/0215859 A1 * | 7/2020 | Horikoshi | B60C 23/0433 |
| 2021/0008935 A1 * | 1/2021 | Broadfield | B60C 23/0484 |
| 2021/0125428 A1 * | 4/2021 | Tedesco | G07C 5/0808 |
| 2021/0129600 A1 * | 5/2021 | Phillips | B60C 23/0479 |
| 2021/0164868 A1 | 6/2021 | Wakao | |
| 2021/0221186 A1 * | 7/2021 | Kanbayashi | B60C 23/0461 |
| 2021/0402832 A1 * | 12/2021 | Stalnaker | B60C 23/0479 |
| 2022/0326703 A1 * | 10/2022 | Raje | G05B 23/0283 |
| 2023/0044053 A1 * | 2/2023 | Moetteli | B60C 23/10 |
| 2023/0226860 A1 * | 7/2023 | Lesesky | B60C 23/0479 340/442 |
| 2023/0398817 A1 * | 12/2023 | Ozono | B60C 23/04 |
| 2024/0174032 A1 * | 5/2024 | Young | B60C 23/20 |
| 2025/0091394 A1 * | 3/2025 | Gravell | B60C 23/20 |
| 2025/0128550 A1 * | 4/2025 | Nakajima | B60C 23/20 |

FOREIGN PATENT DOCUMENTS

| | | | | |
|---|---|---|---|---|
| CN | 102481816 A | | 5/2012 | |
| CN | 113147279 A | * | 7/2021 | B60C 23/04 |
| CN | 113524989 A | * | 10/2021 | B60C 23/04 |
| CN | 113547879 A | * | 10/2021 | B60C 23/0422 |
| CN | 114872498 A | * | 8/2022 | B60C 23/0401 |
| CN | 114953859 A | * | 8/2022 | B60C 23/04 |
| CN | 114953860 A | * | 8/2022 | B60C 23/061 |
| CN | 115447324 A | * | 12/2022 | G06K 7/10297 |
| CN | 116461258 A | * | 7/2023 | B60C 23/0403 |
| CN | 116552172 A | * | 8/2023 | B60C 23/006 |
| CN | 114407587 B | * | 9/2023 | B60C 23/04 |
| CN | 111845221 B | * | 10/2023 | B60C 23/04 |
| CN | 117799365 A | * | 4/2024 | B60C 23/0486 |
| CN | 117818258 A | * | 4/2024 | B60C 23/0491 |
| CN | 117901585 A | * | 4/2024 | B60C 23/04 |
| CN | 117962517 A | * | 5/2024 | H04W 4/80 |
| CN | 117984703 A | * | 5/2024 | B60R 16/023 |
| CN | 118322757 A | * | 7/2024 | B60C 23/19 |
| CN | 118544740 A | * | 8/2024 | B60C 23/0474 |
| CN | 118596746 A | * | 9/2024 | B60K 35/265 |
| CN | 118617912 A | * | 9/2024 | B60K 35/28 |
| CN | 118849674 A | * | 10/2024 | B60C 23/0433 |
| CN | 118906713 A | * | 11/2024 | B60C 23/0433 |
| CN | 119037064 A | * | 11/2024 | B60L 58/22 |
| DE | 101 44 361 A1 | | 4/2003 | |
| DE | 10 2005 025 174 A1 | | 2/2006 | |
| DE | 603 18 781 T2 | | 2/2009 | |
| DE | 10 2014 220 814 A1 | | 4/2016 | |
| DE | 102020106012 A1 | * | 10/2020 | B60C 23/0401 |
| DE | 102016221633 B4 | * | 12/2020 | B60C 23/0401 |
| DE | 102007007672 B4 | * | 5/2023 | B60C 23/0408 |
| DE | 102023200249 A1 | * | 7/2024 | B60C 23/0477 |
| EP | 1 053 114 B1 | | 11/2000 | |
| EP | 3666557 A1 | * | 6/2020 | G07C 5/12 |
| EP | 3715152 A1 | * | 9/2020 | B60C 23/0477 |
| EP | 3088219 B1 | * | 3/2022 | B60C 23/0462 |
| EP | 3501860 B1 | * | 12/2022 | B60C 23/0479 |
| EP | 4140783 A1 | * | 3/2023 | B60C 23/0477 |
| EP | 4306337 A1 | * | 1/2024 | B60C 23/0476 |
| EP | 4344907 A1 | * | 4/2024 | B60C 23/0474 |
| EP | 4382319 A1 | * | 6/2024 | B60C 23/0476 |
| EP | 4393728 A1 | * | 7/2024 | G07C 5/008 |
| EP | 4438348 A1 | * | 10/2024 | B60C 23/0476 |
| EP | 4215385 B1 | * | 5/2025 | B60C 23/0479 |
| GB | 2536497 A | | 9/2016 | |
| JP | 2004-279217 A | | 10/2004 | |
| JP | 2006-327554 A | | 12/2006 | |
| JP | 2008-298723 A | | 12/2008 | |
| JP | 2011-016462 A | | 1/2011 | |
| JP | 2012-218582 A | | 11/2012 | |
| JP | 2016-124395 A | | 7/2016 | |
| JP | 2019-14401 A | | 1/2019 | |
| JP | 2019-191122 A | | 10/2019 | |
| JP | 2020-085610 A | | 6/2020 | |
| JP | 2022094950 A | * | 6/2022 | G08C 17/02 |
| JP | 7381428 B2 | * | 11/2023 | B60C 23/0481 |
| JP | 7667031 B2 | * | 4/2025 | B60C 23/0476 |
| KR | 20200021313 A | * | 2/2020 | B60C 23/0476 |
| KR | 20240018750 A | * | 2/2024 | B60C 23/18 |
| WO | WO-2018056115 A1 | * | 3/2018 | B60C 23/04 |
| WO | WO-2018232608 A1 | * | 12/2018 | B60C 23/04 |
| WO | WO-2019092352 A1 | * | 5/2019 | B60C 23/0454 |
| WO | WO-2022039137 A1 | * | 2/2022 | B60C 23/0476 |
| WO | WO-2022051044 A1 | * | 3/2022 | B60C 23/20 |
| WO | WO-2022123810 A1 | * | 6/2022 | B60C 23/0474 |
| WO | WO-2022139786 A1 | * | 6/2022 | B60C 23/0476 |
| WO | WO-2022155009 A1 | * | 7/2022 | B60C 23/0474 |
| WO | WO-2022158125 A1 | * | 7/2022 | B60C 23/0476 |
| WO | WO-2022206057 A1 | * | 10/2022 | B60C 23/04 |
| WO | WO-2023014239 A1 | * | 2/2023 | G01L 17/00 |
| WO | WO-2023067010 A1 | * | 4/2023 | G01L 11/002 |
| WO | WO-2023199287 A1 | * | 10/2023 | G08C 17/02 |
| WO | WO-2024232052 A1 | * | 11/2024 | B60C 23/04 |
| WO | WO-2024247318 A1 | * | 12/2024 | B60C 23/04 |
| WO | WO-2024247321 A1 | * | 12/2024 | B60C 23/04 |
| WO | WO-2025057865 A1 | * | 3/2025 | B60C 23/04 |
| WO | WO-2025084465 A1 | * | 4/2025 | B60C 23/04 |

OTHER PUBLICATIONS

Cao, et al., "An application of optimized bayesian estimation data fusion algorithm in tire pressure monitoring system," 2018 Chinese Control And Decision Conference (CCDC), Shenyang, China, 2018, pp. 6564-6568, doi: 10.1109/CCDC.2018.8408284. (https://ieeexplore.ieee.org/document/8408284) (Year: 2018).*

* cited by examiner

AIR PRESSURE MANAGEMENT DEVICE, AIR PRESSURE MANAGEMENT METHOD, AND AIR PRESSURE MANAGEMENT PROGRAM

TECHNICAL FIELD

The present technology relates to an air pressure management device, an air pressure management method, and an air pressure management program for managing air pressure of a tire.

BACKGROUND ART

A plurality of tires mounted on a vehicle are inflated to appropriate air pressure, thereby ensuring the running stability of the vehicle. Air pressure of this type of tire generally decreases due to a natural leakage overtime. An absolute value of an air pressure decrease amount depends on the air pressure of the tire, and therefore, for example, in a case of tires for truck and bus, air pressure decreases by around from 30 to 50 (kPa) in one month in some cases. Also, it is assumed that the air pressure of the tire decreases rapidly due to a trouble, such as a puncture, a valve failure, and wheel damage, as well as the natural leakage described above. For this reason, a known technique in which a degree of decrease in tire air pressure that indicates a declining trend of air pressure of a tire is calculated, a decrease time taken for air pressure to decrease down to set air pressure is estimated based on this degree of decrease in tire air pressure, and the estimated decrease time is notified to a driver is designed (see, for example, Japan Unexamined Patent Publication No. 2006-327554 A).

The degree of decrease in tire air pressure described above, which indicates the declining trend of air pressure of a tire, varies greatly depending on an influence, such as specifications, use environment (use temperature), and inflated air pressure of the tire. Therefore, to determine whether an abnormality is present by comparing the degree of decrease in tire air pressure with a threshold value, there has been a problem that accurate determination with a constant threshold value has been difficult.

SUMMARY

The present technology provides an air pressure management device, an air pressure management method, and an air pressure management program that allow accurately determining presence of an abnormality in air pressure of a tire.

An air pressure management device according to an embodiment of the present technology includes a temperature conversion air pressure calculation unit, an air pressure decrease rate calculation unit, an air pressure decrease rate threshold value setting unit, and a first determination unit. The temperature conversion air pressure calculation unit calculates a temperature conversion air pressure of a tire based on acquired temperature and air pressure of the tire. The air pressure decrease rate calculation unit calculates an air pressure decrease rate from an amount of change in the temperature conversion air pressure for a predetermined period. The air pressure decrease rate indicates a declining trend of the air pressure of the tire. The air pressure decrease rate threshold value setting unit sets an air pressure decrease rate threshold value corresponding to an acquired physical quantity using a threshold value table. The threshold value table specifies the air pressure decrease rate threshold value associated with the predetermined physical quantity regarding the tire. The first determination unit determines whether the air pressure of the tire is abnormal based on the calculated air pressure decrease rate and the set air pressure decrease rate threshold value.

In the air pressure management device described above, the physical quantity is preferably any one of a thermal history amount, the temperature, and the air pressure of the tire.

Additionally, in the air pressure management device described above, the air pressure decrease rate calculation unit preferably calculates the respective air pressure decrease rates of a set of the tires paired based on wheel positions of a vehicle on which the tires are mounted, and the air pressure management device preferably includes a second determination unit that determines whether an air pressure of one of the tires is abnormal among the set of tires based on a deviation of the respective air pressure decrease rates.

Additionally, the air pressure management device described above preferably includes a table update unit. The table update unit preferably acquires the physical quantity and the air pressure decrease rate of the tire. The table update unit preferably updates the threshold value table based on the acquired physical quantity and air pressure decrease rate.

Additionally, in the air pressure management device described above, the table update unit preferably acquires the physical quantity and the air pressure decrease rate of a tire having same specifications of the tire accumulated in an external device.

Additionally, the air pressure management device described above preferably includes a notification unit. The notification unit is configured such that when the first determination unit determines that the air pressure of the tire is abnormal and in a case where the tire is continuously used at the calculated air pressure decrease rate, the notification unit notifies a time until the air pressure of the tire decreases to a limit air pressure.

An air pressure management method according to an embodiment of the present technology includes: calculating a temperature conversion air pressure of a tire based on acquired temperature and air pressure of the tire; calculating an air pressure decrease rate from an amount of change in the temperature conversion air pressure for a predetermined period; setting an air pressure decrease rate threshold value corresponding to an acquired physical quantity using a threshold value table, the threshold value table specifying the air pressure decrease rate threshold value associated with the predetermined physical quantity regarding the tire; and determining whether the air pressure of the tire is abnormal based on the calculated air pressure decrease rate and the set air pressure decrease rate threshold value.

An air pressure management program according to an embodiment of the present technology causes an air pressure management device to execute: calculating a temperature conversion air pressure of a tire based on acquired temperature and air pressure of the tire; calculating an air pressure decrease rate from an amount of change in the temperature conversion air pressure for a predetermined period; setting an air pressure decrease rate threshold value corresponding to an acquired physical quantity using a threshold value table, the threshold value table specifying the air pressure decrease rate threshold value associated with the predetermined physical quantity regarding the tire; and determining whether the air pressure of the tire is abnormal based on the calculated air pressure decrease rate and the set air pressure decrease rate threshold value.

According to an embodiment of the present technology, whether the air pressure decrease of the tire is abnormal is determined based on the air pressure decrease rate threshold value set corresponding to the current physical quantity and the air pressure decrease rate, and therefore the presence of an abnormality in air pressure decrease of the tire can be accurately determined.

DETAILED DESCRIPTION

An air pressure management device according to embodiments of the present technology will be described below with reference to the drawings. The present technology is not limited by the present embodiment. Constituents of the present embodiment include elements that can be substituted and easily conceived of by one skilled in the art or that are substantially identical.

Figure 1:
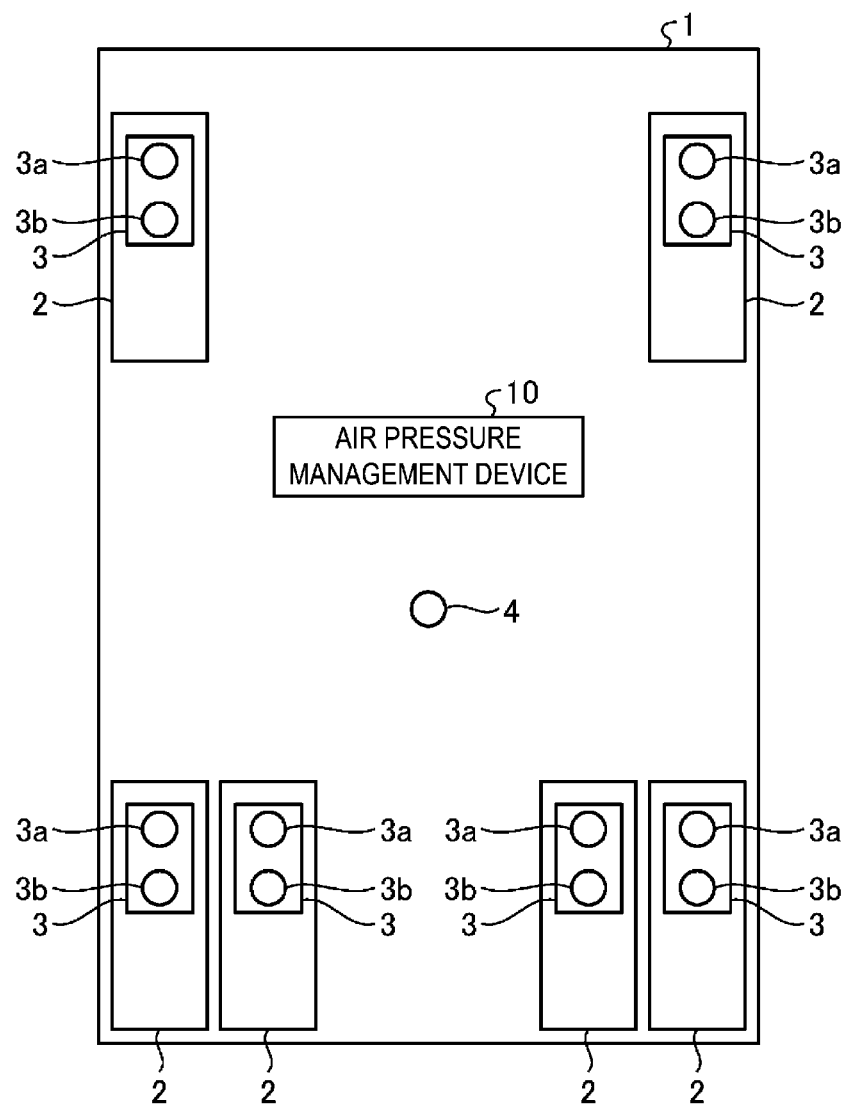
FIG. 1 is a schematic diagram illustrating a vehicle mounting an air pressure management device according to the present embodiment.
Figure 2:
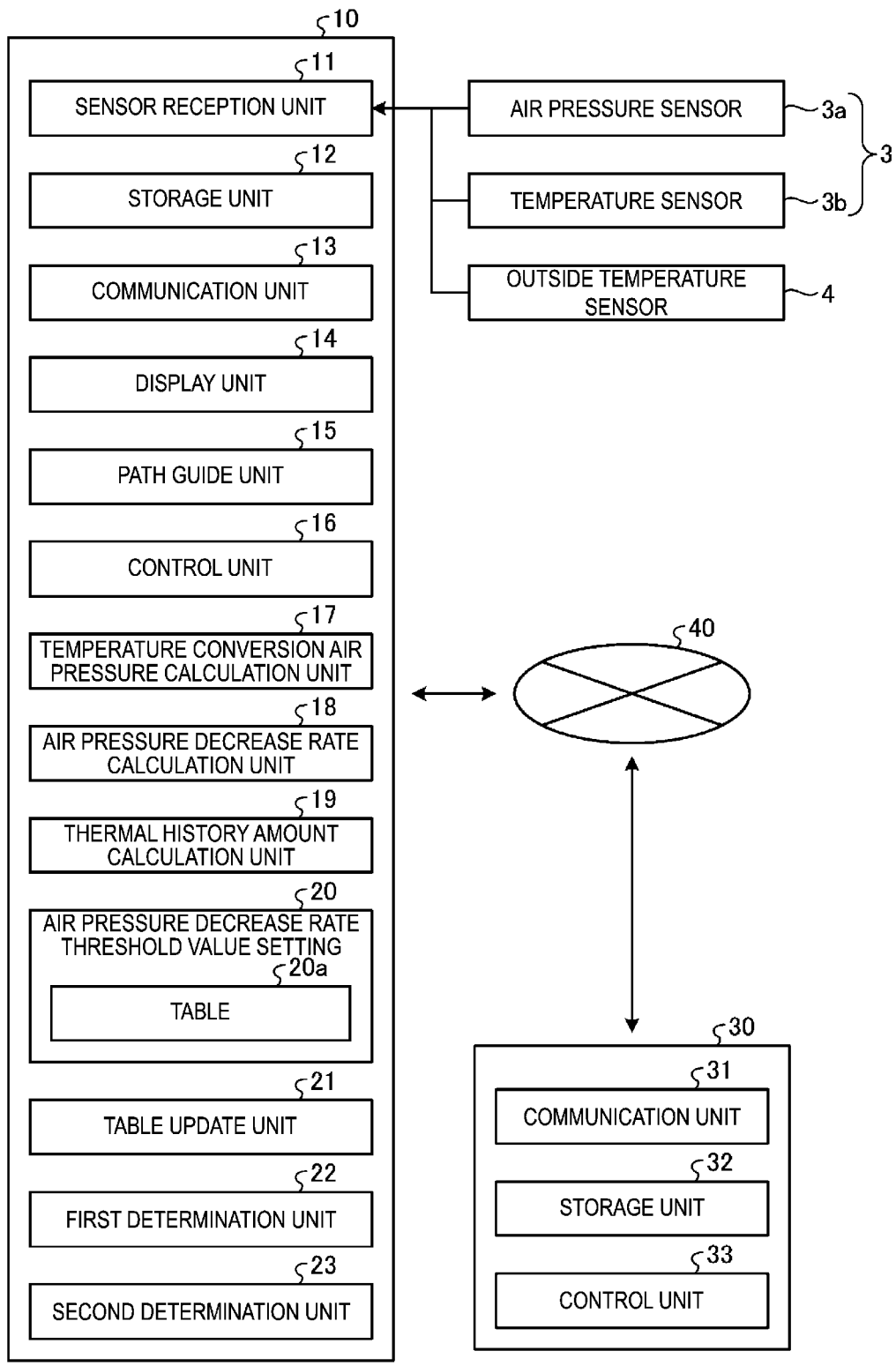
FIG. 2 is a block diagram illustrating functional configurations of the air pressure management device and a server device.

FIG. 1 is a schematic diagram illustrating a vehicle mounting an air pressure management device according to the present embodiment. FIG. 2 is a block diagram illustrating functional configurations of the air pressure management device and a server device. An air pressure management device 10 according to the present embodiment is disposed on a vehicle 1 to manage air pressure of a plurality of tires 2 of the vehicle 1. Specifically, the air pressure management device 10 monitors an air pressure decrease rate of each of the tires 2 for management of air pressure, and when the air pressure decrease rate exceeds (becomes more than) a threshold value, the air pressure management device 10 notifies that the air pressure of the tire 2 is abnormal.

As illustrated in FIG. 1, each of the plurality of tires 2 included in the vehicle 1 is provided with a sensor 3, and the sensors 3 are communicably connected to the air pressure management device 10. The vehicle 1 is also provided with an outside temperature sensor 4 that measures an outside temperature. This outside temperature sensor 4 is provided at a location that is less susceptible to disturbances, such as direct sunlight or engine waste heat, and is communicably connected to the air pressure management device 10. Additionally, the vehicle 1 in which the air pressure management device 10 is disposed is preferably a truck or a bus that mounts the relatively large-sized tires 2 and travels a long distance, but is not limited thereto.

The sensors 3 are tire pressure monitoring system (TPMS) sensors, and include an air pressure sensor $3a$ that measures the air pressure of the tire 2, and a temperature sensor $3b$ that measures the temperature of air in the tire 2. Furthermore, the sensor 3 may further include an acceleration sensor that measures a centrifugal acceleration acting on the tire 2. The sensor 3 is attached to, for example, an air valve of each tire 2. A sensor ID (identification information) is set for each sensor 3, and the correspondence relationship among the sensor ID of the sensor 3, a tire ID (identification information) of the tire 2 including the sensor 3, and a wheel position on which the tire 2 is mounted (for example, in a truck or a bus, the left front wheel, right front wheel, left inner rear wheel, left outer rear wheel, right inner rear wheel, or right outer rear wheel) is registered in the air pressure management device 10. Measurement data of each sensor 3 can be transmitted to the air pressure management device 10 at every predetermined time by using, for example, short-range wireless communication, such as radio frequency (RF) communication. Note that, in the present embodiment, air is exemplified as a gas inflated to the tire 2 and includes air adjusted such that a proportion of nitrogen becomes higher than usual (e.g., 98% or more).

The air pressure management device 10 is an onboard device mounted on a vehicle body of the vehicle 1. As illustrated in FIG. 2, the air pressure management device 10 includes a sensor reception unit 11, a storage unit 12, a communication unit 13, a display unit (notification unit) 14, a path guide unit 15, a control unit 16, a temperature conversion air pressure calculation unit 17, an air pressure decrease rate calculation unit 18, a thermal history amount calculation unit (physical quantity acquisition unit) 19, an air pressure decrease rate threshold value setting unit 20, a table update unit 21, a first determination unit 22, and a second determination unit 23. Additionally, the air pressure management device 10 is communicatively connected to a predetermined server device (external device) 30 via a communication network 40, such as an Internet line. In the present embodiment, the air pressure management device 10 will be described as an onboard device mounted on the vehicle 1, but is not limited thereto, and may be configured as a mobile terminal, such as a smartphone, and the mobile terminal may be connected to the vehicle 1 as necessary.

The sensor reception unit 11 receives (obtains) data transmitted from the respective sensors 3 (the air pressure sensors $3a$ and the temperature sensors $3b$) of the plurality of tires 2 and outside temperature sensor 4. In the present embodiment, the air pressure management device 10 is configured to integrally include the sensor reception unit 11, but the sensor reception unit 11 may be mounted on a vehicle as a separate body.

The storage unit 12 includes storage means such as a volatile or nonvolatile memory or an HDD (hard disk drive). The storage unit 12 stores various programs to be executed by the control unit 16 and various data. In the present embodiment, the storage unit 12 stores information on the air pressure and the temperature of each of the tires 2 and information on an outside temperature received by the sensor reception unit 11 at every predetermined time. In this case, the corresponding tire ID and wheel position are preferably determined from the sensor ID, and information on the air pressure and the temperature of each of the tires 2 is preferably stored as historical information in which they are associated with one another. Furthermore, when the tire 2 is rotated in the vehicle 1, it is assumed that the correspondence relationship between the tire ID (sensor ID) and the wheel position registered in the air pressure management device 10 is corrected.

The communication unit 13 can wirelessly communicate with the server device 30 as an external device via the communication network 40. In the present embodiment, the communication unit 13 routinely transmits the thermal history amount (physical quantity) received by the tire 2 of own vehicle and the air pressure decrease rate of the tire 2 to the server device 30. The thermal history amount and the air pressure decrease rate of the tire 2 can be calculated from the respective air pressure and temperature of the tire 2. The server device 30 forms a database for each specification (such as a model number and a size) of the tire, and the thermal history amount and the air pressure decrease rate of the tire transmitted from each of vehicles present on the market are associated with one another and stored in each database. In this case, under the control by the control unit 16, the communication unit 13 may acquire the information relating to the thermal history amount and the air pressure decrease rate of the tire having the same specifications as the tire 2 of own vehicle from the database in the server device 30.

The display unit 14 is a display device including a display screen disposed on, for example, a dashboard of a vehicle body and displaying various pieces of information to be provided to a user (driver). In the present embodiment, for example, map information including a path up to a set destination and information relating to the current air pressure and the temperature of each of the tires 2 mounted on the vehicle 1 and the outside temperature are displayed. Furthermore, the display unit 14 can display information relating to a temperature conversion air pressure and the air pressure decrease rate calculated based on the air pressure and the temperature. Furthermore, in a case where the air pressure is determined to be abnormal in the determination result whether the air pressure of the tire 2 is abnormal based on the air pressure decrease rate, the display unit 14 can display information relating to a period (distance) during which the vehicle 1 can travel with the tires 2 mounted. Thus, in the present embodiment, the display unit 14 functions as a notification unit notifying that the air pressure of the tire 2 is abnormal.

The path guide unit 15 has a so-called navigation function and searches a path from the current location of the vehicle 1 to the destination to perform path guide. For example, in a case where the air pressure of the tire 2 is determined to be abnormal, the path guide unit 15 searches the path from the current location of the vehicle 1 to a local maintenance service shop and performs the path guide.

The control unit 16 includes, for example, a central processing unit (CPU), a read-only memory (ROM), and a random-access memory (RAM), and controls the operation of the entire air pressure management device 10 based on a program stored in the storage unit 12. For example, in a case where the air pressure of the tire 2 is determined to be abnormal, when the tire 2 is continuously used at the calculated air pressure decrease rate, a time taken for the air pressure of the tire 2 to decrease to a limit air pressure (estimated air pressure decrease time) is estimated, and the display unit 14 displays this estimated air pressure decrease time.

The temperature conversion air pressure calculation unit 17 calculates the temperature conversion air pressure found by converting the air pressure into air pressure at a predetermined temperature based on the acquired temperature and air pressure of each of the tires 2 under the control by the control unit 16. In general, since the air pressure of the tire 2 tends to change according to the air temperature, the air pressure may differ during vehicle operation and during stop, and it is difficult to accurately manage the variation state of the air pressure. Thus, the temperature conversion air pressure calculation unit 17 converts the air pressure of the tire 2 into air pressure at a specified temperature (for example, 25° C.) based on, for example, Combined Gas Law. In this way, the variation in air pressure associated with the temperature change of the tire 2 can be suppressed, and the air pressure changes can be accurately managed.

The air pressure decrease rate calculation unit 18 calculates the air pressure decrease rate from an amount of change in the temperature conversion air pressure described above in a predetermined period under the control by the control unit 16. The air pressure decrease rate is a value indicating a declining trend of the air pressure by an air pressure decrease amount (kPa) per unit time (e.g., one minute). Generally, the air pressure of the tire decreases due to a natural leakage over time. The absolute value of the air pressure decrease amount depends on the air pressure of the tire, and thus, the air pressure may be reduced by 30 to 50 (around kPa) in one month in the case of, for example, a tire for a truck or a bus. In contrast, in the case of a trouble, such as a puncture, a valve failure, and wheel damage of the tire, the air pressure decrease rate is extremely large compared with the case of a natural leakage. Therefore, by focusing on this air pressure decrease rate, the trouble of the tire can be found early. Note that the air pressure decrease rate calculation unit 18 preferably repeatedly calculates the air pressure decrease rate from the amount of change in the temperature conversion air pressure for a predetermined period (for example, five minutes). In this way, it is possible to determine whether the air pressure of the tire is abnormal accurately and early.

The thermal history amount calculation unit 19 calculates the thermal history amount received by the tire 2 for the predetermined period routinely or in real time based on the acquired information of the temperature of each of the tires 2 under the control by the control unit 16. The thermal history amount is also referred to as a temperature severity number (TSN) and is an index indicating the amount of heat received by the tire 2 during the predetermined period, and the larger the thermal history amount is, the more oxidative degradation of the tire 2 tends to progress. This is due to an increase in an air permeation coefficient of a rubber member included in the tire 2 when the temperature of the tire 2 increases. Furthermore, the temperature of the tire 2 varies greatly depending on, particularly, heat generation of the tire itself when the vehicle 1 is traveling and the outside temperature when the vehicle 1 is traveling. The predetermined period is preferably set to be at least one day or more.

The air pressure decrease rate threshold value setting unit 20 sets an air pressure decrease rate threshold value under the control by the control unit 16. The air pressure decrease rate threshold value is a threshold value for determining whether the air pressure of the tire 2 is abnormal, compared to the air pressure decrease rate described above. Thus, the air pressure decrease rate threshold value is defined by the air pressure decrease amount (kPa) per unit time (e.g., one minute), similar to the air pressure decrease rate. In this type of determination, it is also possible to set the air pressure decrease rate threshold value as a fixed value, but the air pressure decrease rate varies greatly depending on, for example, the specification, the air pressure, or the temperature of the tire 2. Accordingly, with the fixed threshold value, it is difficult to accurately determine presence of an abnormality in the air pressure of the tire 2.

Thus, the air pressure decrease rate threshold value is set to be associated with the thermal history amount, which is a predetermined physical quantity regarding the tire 2, and varies according to the thermal history amount. In the present embodiment, the air pressure decrease rate threshold value setting unit 20 includes a threshold value table 20*a* that defines each of the air pressure decrease rate threshold values associated with the thermal history amount, and refers to the threshold value table 20*a* to set the air pressure decrease rate threshold value corresponding to the calculated thermal history amount. According to this configuration, the set air pressure decrease rate threshold value can be changed according to the thermal history amount, and thus the presence of an abnormality in air pressure of the tire 2 can be accurately determined.

Furthermore, the correspondence relationship between the air pressure decrease rate threshold value and the thermal history amount can be set, for example, by an actual equipment test actually using the tires 2 having the same specifications or simulation. Note that in the present embodiment, the air pressure decrease rate threshold value setting unit 20 includes the threshold value table 20*a* that defines each of the air pressure decrease rate threshold values associated with the thermal history amount, but the storage unit 12 may include the threshold value table 20*a*.

The table update unit 21 updates the threshold value table 20*a* in the air pressure decrease rate threshold value setting unit 20 routinely or at a predetermined timing based on the information relating to the acquired thermal history amount and air pressure decrease rate under the control by the control unit 16. In the present embodiment, the table update unit 21 acquires information relating to the thermal history amount and the air pressure decrease rate of the tire having the same specifications (model number and size) as the tire 2 of own vehicle from the database in the server device 30. The table update unit 21 obtains an approximation formula indicating the relationship between the thermal history amount and the air pressure decrease rate from a plurality of pieces of the acquired information, and adds a predetermined margin to this approximation formula to generate a threshold value table indicating the relationship between the thermal history amount and the air pressure decrease rate threshold value, and updates it to the new threshold value table 20*a*. This predetermined margin is set to, for example, a constant value, and is determined by experience or experimental rule.

This configuration updates the threshold value table 20*a* based on the information relating to the thermal history amount and the air pressure decrease rate acquired from the database, and therefore determination accuracy whether the air pressure of the tire 2 is abnormal can be increased, and air pressure abnormality can be notified to the driver early. Note that in the present embodiment, the configuration in which the table update unit 21 acquires the information relating to the thermal history amount and the air pressure decrease rate from the database in the server device 30 has been described, but the configuration is not limited to this. The information relating to the thermal history amount and the air pressure decrease rate of the tire 2 accumulated in own vehicle by continuous use may be acquired, and the threshold value table 20*a* may be updated based on the information relating to the thermal history amount and the air pressure decrease rate.

The first determination unit 22 determines whether the air pressure of the tire 2 is abnormal under the control by the control unit 16. Specifically, the first determination unit 22 determines whether the air pressure of the tire 2 is abnormal by comparing the air pressure decrease rate calculated by the air pressure decrease rate calculation unit 18 and the air pressure decrease rate threshold value set by the air pressure decrease rate threshold value setting unit 20. When the air pressure decrease rate is greater than the air pressure decrease rate threshold value, the first determination unit 22 determines that the air pressure of the tire 2 is abnormal. When the air pressure decrease rate is equal to or less than the air pressure decrease rate threshold value, the first determination unit 22 determines that the air pressure of the tire 2 is normal.

The second determination unit 23 determines the presence of an abnormality in air pressure of a set of the tires 2 paired in advance under the control by the control unit 16. First, the air pressure decrease rate calculation unit 18 calculates the air pressure decrease rate of the set of tires 2 paired in advance based on the wheel position of the vehicle 1. Usually, the temperature of the tire 2 at the wheel position on the inner side of the vehicle 1 tends to be higher than that at the wheel position on the outer side, and the air pressure is likely to decrease. Thus, the pairing is set between opposing positions where the temperature of the tire 2 is substantially equivalent (e.g., the left front wheel and the right front wheel, the left inner rear wheel and the right inner rear wheel, and the left outer rear wheel and the right outer wheel). The second determination unit 23 determines whether the air pressure of the set of tires described above is abnormal based on the calculated deviation of each of the air pressure decrease rates. In the present embodiment, since the tires at the positions where the temperatures of the tires 2 are substantially equivalent are paired, the calculated air pressure decrease rates are usually substantially equivalent and the deviation is considered to be close to 0. However, in a case where a defect occurs in one of the tires 2 and the air pressure decrease rate increases, the deviation of the respective air pressure decrease rates is greater than a predetermined threshold value, and thus an abnormality in the air pressure of the tire 2 can be determined. Accordingly, in this configuration, the presence of an abnormality in the air pressure of one of the tires 2 among the set of tires 2 is determined based on the deviation of the air pressure decrease rates of the set of paired tires 2, and therefore, for example, the presence of an abnormality in the air pressure of the tire 2 can be accurately determined, for example, even in an initial stage of a failure. Accordingly, by combining the determination by the second determination unit 23 with the determination by the first determination unit 22, it is possible to accurately determine the presence of an abnormality in the air pressure of the tire 2 early.

On the other hand, the server device 30 is communicably connected to the air pressure management device 10, holds information transmitted from the air pressure management device 10, and transmits necessary information in response to the request of the air pressure management device 10. As illustrated in FIG. 2, the server device 30 includes a communication unit 31, a storage unit 32, and a control unit 33.

The communication unit 31 can wirelessly communicate with the air pressure management device 10 via the communication network 40. The communication unit 31 receives information relating to the thermal history amount and the air pressure decrease rate of the tire of own vehicle transmitted from the air pressure management device 10. The communication unit 31 transmits the information relating to the thermal history amount and the air pressure decrease rate of the tire having the same specifications as those of the requested tire to the air pressure management device 10 according to the request of the air pressure management device 10.

The storage unit 32 stores the information relating to the thermal history amount and the air pressure decrease rate of the tire s of the vehicle transmitted from each air pressure management device 10. Specifically, the storage unit 32 constitutes a database for storing the information relating to the thermal history amount and the air pressure decrease rate for each of the specifications of the tire. The database is updated routinely or in real time based on the acquired information relating to the thermal history amount and the air pressure decrease rate of the tire.

The control unit 33 includes, for example, a CPU, a ROM, and a RAM, and controls the operation of the entire server device 30 based on information received from the air pressure management device 10 or a program stored in the storage unit 32.

Figure 3:
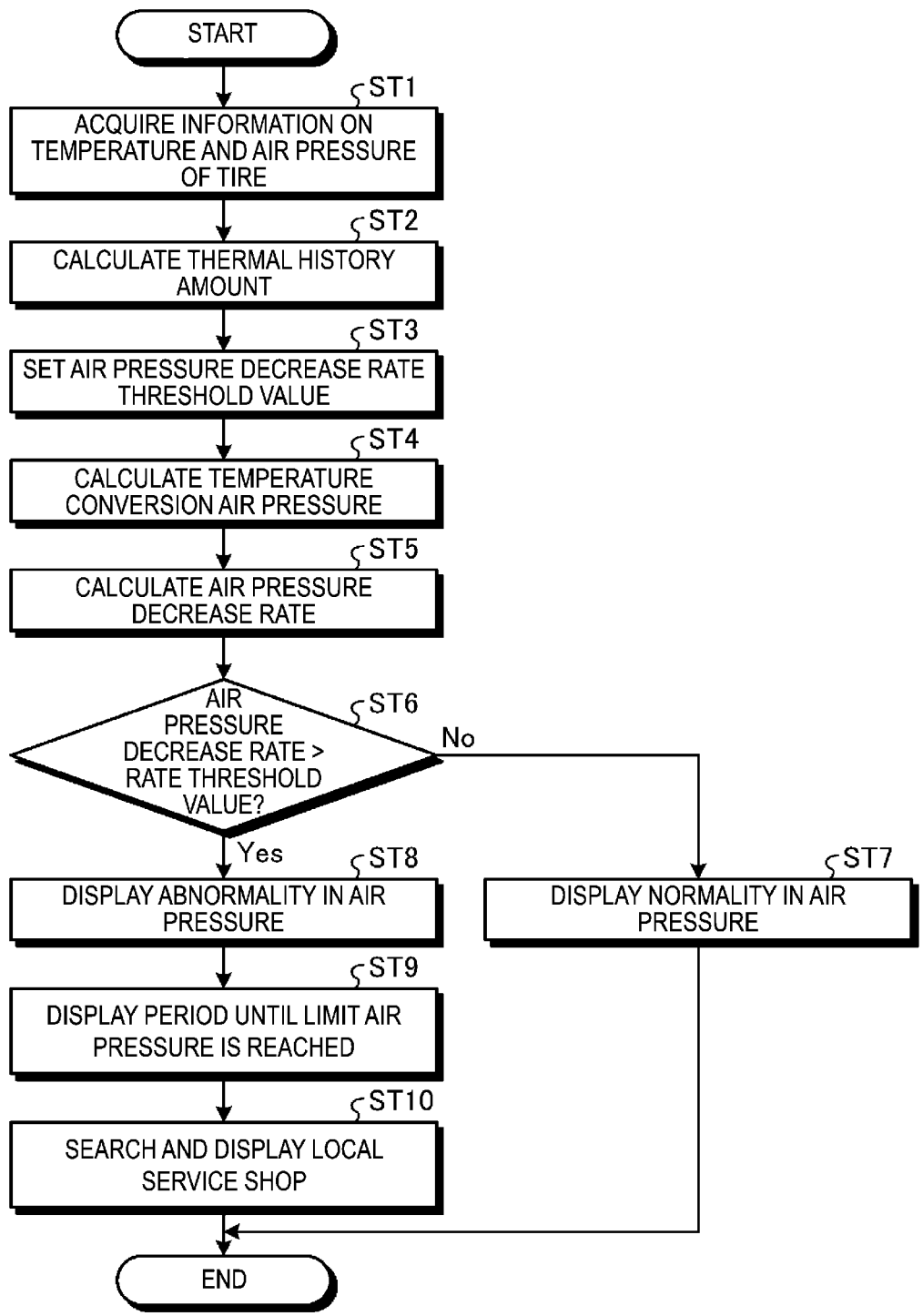
FIG. 3 is a flowchart depicting an operation procedure of the air pressure management device.
Figure 4:
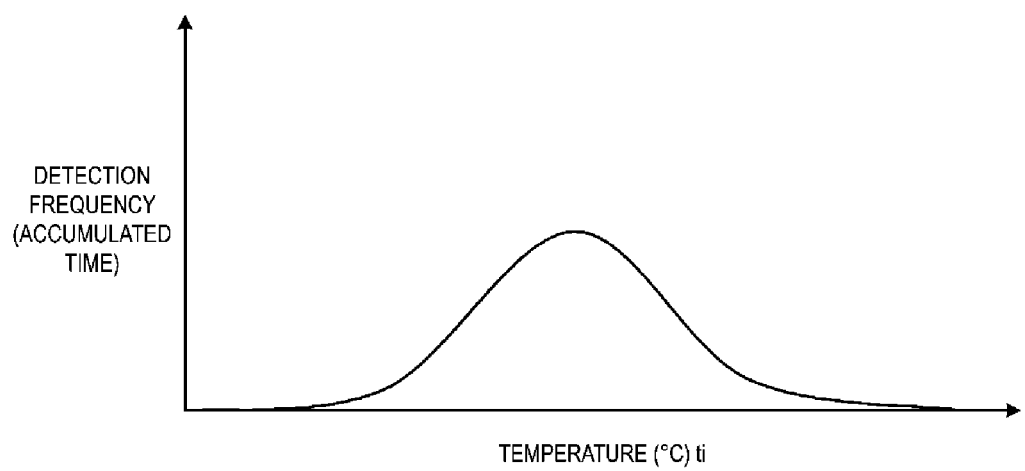
FIG. 4 is a diagram illustrating a relationship between a temperature detected in a predetermined period and detection frequency.
Figure 5:
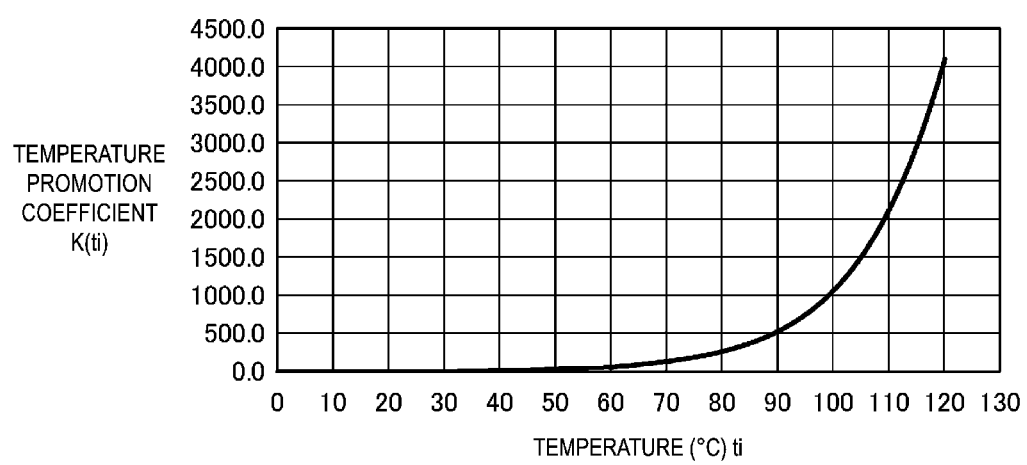
FIG. 5 is a diagram illustrating a relationship between a temperature promotion coefficient and a temperature.
Figure 6:
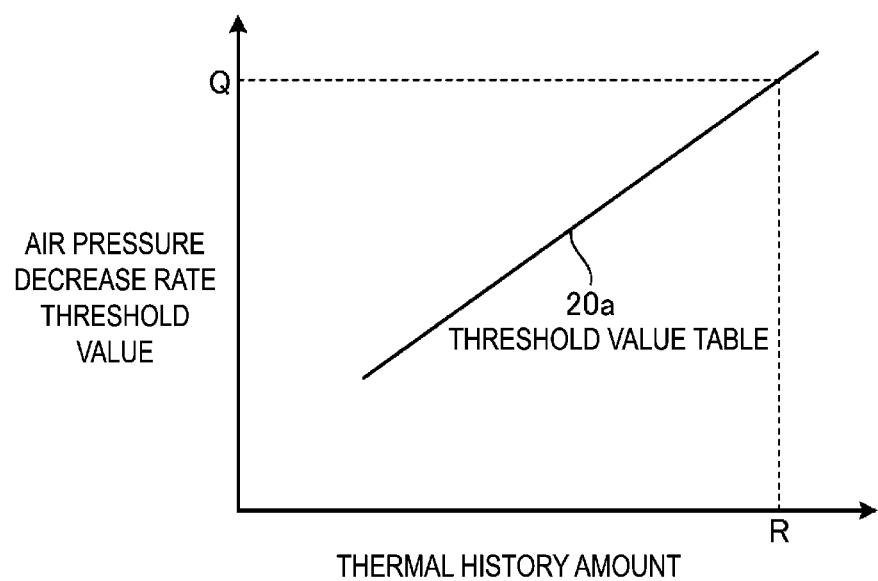
FIG. 6 is a schematic diagram of a threshold value table illustrating a relationship between a thermal history amount and an air pressure decrease rate threshold value.
Figure 7:
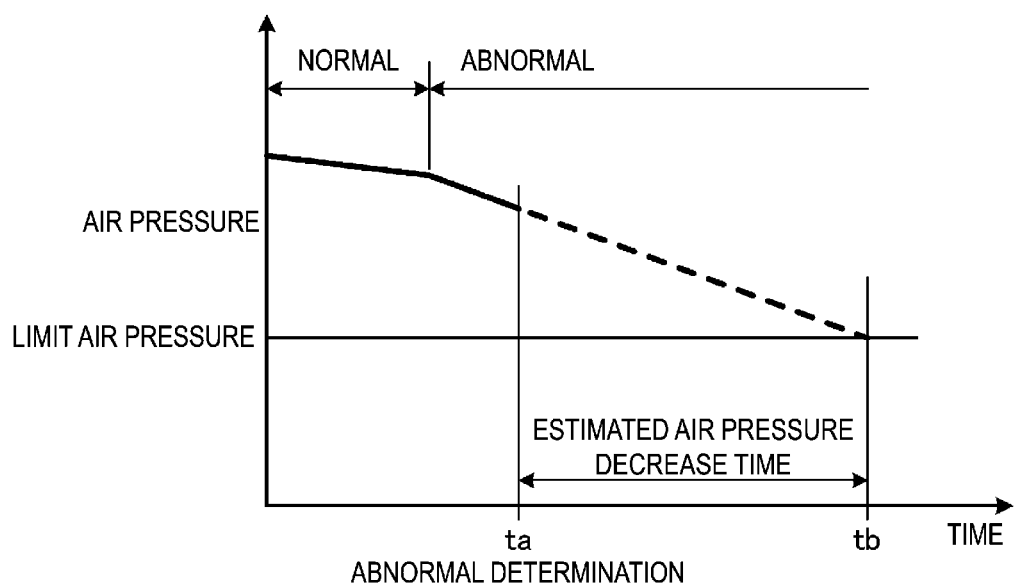
FIG. 7 is a diagram illustrating an estimated air pressure decrease time until air pressure reaches a limit air pressure.

Next, the operation of the air pressure management device 10 according to the present embodiment will be described. FIG. 3 is a flowchart depicting an operation procedure of the air pressure management device. FIG. 4 is a diagram illustrating a relationship between a temperature detected in a predetermined period and detection frequency. FIG. 5 is a diagram illustrating a relationship between a temperature promotion coefficient and a temperature. FIG. 6 is a schematic diagram of the threshold value table illustrating the relationship between the thermal history amount and an air pressure decrease rate threshold value. FIG. 7 is a diagram illustrating the estimated air pressure decrease time until the air pressure reaches the limit air pressure.

An operation procedure from Step ST1 to Step ST10 depicted in FIG. 3 is repeated routinely. As depicted in FIG. 3, first, the sensor reception unit 11 acquires (receives) the information on the temperature and the air pressure of the tire 2 measured by the sensor 3 provided on each of the tires 2 of the vehicle 1 at every predetermined time (for example, 10 minutes) (Step ST1). The storage unit 12 stores the acquired information as history information associated with time information for each of the tires 2 identified by the sensor ID.

Next, the thermal history amount calculation unit 19 calculates the thermal history amount of the tire 2 for a predetermined period (Step ST2). Here, the thermal history amount calculation unit 19 calculates the respective thermal history amounts of all of the six tires 2, but for convenience of explanation, one tire 2 will be described. The thermal history amount calculation unit 19 classifies the temperature information of the tire 2 for a predetermined period (for example, the latest one month) acquired from the storage unit 12 into temperature intervals of 1° C. between 0° C. and 120° C., and as illustrated in FIG. 4, acquires a detection frequency of a measurement value in each temperature interval. The detection frequency indicates an accumulated time when the temperature information measured during the predetermined period is divided into the respective temperature intervals. In general, the temperature of the tire 2 tends to be low in the outer re ar wheels of the vehicle and tends to be high in the inner rear wheels. Thus, the detection frequency (accumulated time) is preferably acquired according to the wheel position on which the tire 2 is mounted.

The thermal history amount in the predetermined period is calculated by the following mathematical formula (1) by using a temperature promotion coefficient (promotion coefficient) related to a change in a state of a tire member given in advance with a temperature as a parameter and the detection frequency (accumulated time) when the plurality of pieces of temperature information measured during the predetermined period are divided into the predetermined temperature intervals.

$$\text{Thermal history amount for predetermined period} = \Sigma(K(ti) \times T(ti)) \quad (1)$$

In mathematical formula (1) above, the thermal history amount in the predetermined period is the sum of the section heat amounts over the above-described all temperature intervals. Furthermore, ti is temperature, and $K(ti)$ is a temperature promotion coefficient at the temperature ti. Furthermore, $T(ti)$ is an accumulated time at the temperature ti. The temperature promotion coefficient $K(ti)$ is a contribution coefficient related to a change in the state of the tire member with the temperature ti as a parameter, and is considered to be proportional to, for example, $\exp(\alpha \cdot ti)$ based on a well-known Arrhenius reaction rate formula. In FIG. 5, $\alpha=0.069$ is set based on the assumption that the deterioration of the tire doubles when the temperature ti rises by 10° C. Furthermore, the temperature ti is the maximum temperature in each temperature interval, but it is not limited thereto, and may be, for example, an average temperature at each temperature interval. The accumulated time is an accumulated time at the temperature interval including the temperature.

Next, the air pressure decrease rate threshold value setting unit 20 sets the air pressure decrease rate threshold value based on the calculated thermal history amount (Step ST3). In the present embodiment, the air pressure decrease rate threshold value setting unit 20 includes the threshold value table 20a that defines the respective air pressure decrease rate threshold values associated with the thermal history amounts. Thus, as illustrated in FIG. 6, the air pressure decrease rate threshold value setting unit 20 refers to the threshold value table 20a to set an air pressure decrease rate threshold value Q corresponding to a calculated thermal history amount R. According to this configuration, the set air pressure decrease rate threshold value can be changed according to the current thermal history amount, and thus the presence of an abnormality in air pressure of the tire 2 can be accurately determined.

Next, the temperature conversion air pressure calculation unit 17 calculates the temperature conversion air pressure based on the acquired temperature and air pressure of each of the tires 2 (Step ST4). Specifically, the temperature conversion air pressure calculation unit 17 converts the acquired air pressure of the tire 2 into an air pressure at a specified temperature (for example, 25° C.) for each predetermined time. In this way, the variation in air pressure associated with the temperature change of the tire 2 can be suppressed, and the change in air pressure can be accurately managed.

Next, the air pressure decrease rate calculation unit 18 calculates the air pressure decrease rate from the calculated amount of change in temperature conversion air pressure (Step ST5). Specifically, the amount of change (kPa) in the temperature conversion air pressures between before and after the elapse of the predetermined time is divided by the predetermined time to ensure calculating it as an air pressure decrease amount (kPa) per unit time (e.g., one minute). In the present embodiment, focusing on the air pressure decrease rate, the presence of an abnormality in the air pressure is determined based on the air pressure decrease rate, and thus a trouble of the tire 2 can be found accurately and early.

Next, the first determination unit 22 determines whether the air pressure decrease rate calculated by the air pressure decrease rate calculation unit 18 is larger than the air pressure decrease rate threshold value (Step ST6). In this determination, when the air pressure decrease rate is the air pressure decrease rate threshold value or less (Step ST6; No), the first determination unit 22 displays that the air pressure of the tire 2 is normal on the display unit 14 (Step ST7). After Step ST7, the air pressure management device 10 ends the process once, but repeatedly performs the processes from Step ST1 described above routinely. In a case where the air pressure decrease rate is greater than the air pressure decrease rate threshold value in the above-described determination (Step ST6; Yes), the first determination unit 22 displays that the air pressure of the tire 2 is abnormal on the display unit 14 (Step ST8). According to this configuration, whether the air pressure of the tire 2 is abnormal is determined based on the air pressure decrease rate threshold value set corresponding to the current thermal history amount and the air pressure decrease rate, and therefore the presence of an abnormality in the air pressure of the tire 2 can be accurately determined.

Next, in a case where the air pressure of the tire 2 is determined to be abnormal, when the tire 2 is continuously used at the calculated air pressure decrease rate, the control unit 16 causes the display unit 14 to display the period until the air pressure of the tire 2 reaches the limit air pressure (Step ST9). Specifically, in a case where the air pressure of the tire 2 is determined to be abnormal, as illustrated in FIG. 7, when the tire 2 is continuously used at the air pressure decrease rate described above, the control unit 16 estimates a time (estimated air pressure decrease time) from a time ta at which abnormal determination has been made until a time tb at which the air pressure of the tire 2 decreases to the limit air pressure. Then, the control unit 16 displays this estimated air pressure decrease time on the display unit 14. Here, the limit air pressure is an air pressure at which the vehicle 1 cannot travel, and is, for example, set to a value 70% or less of the "maximum air pressure" defined in JATMA (The Japan Automobile Tyre Manufacturers Association, Inc.). This limit air pressure may be the temperature conversion air pressure reference described above, or may be an absolute air pressure reference. In addition, to estimate the time until it decreases to the limit air pressure, the temperature change during the use of the tire estimated from an annual air temperature may be considered.

According to this configuration, the time until it decreases to the limit air pressure is displayed, and thus the driver (user) can retract to a safe location or move to a maintenance service shop within the time. Note that in the present embodiment, the control unit 16 is configured to estimate the time (estimated air pressure decrease time) until it lowers to the limit air pressure, but a distance that the vehicle 1 can move in the time may be estimated.

Next, the control unit 16 causes the path guide unit 15 to search the path from the current location of the vehicle 1 to the local maintenance service shop and causes the display unit 14 to display the searched maintenance service shop (Step ST10). In this case, route guidance to the maintenance service shop may be performed. In addition, when the local maintenance service shop cannot be found within the time until the air pressure decreases to the limit air pressure described above, the control unit 16 may display the contact (telephone number) of this maintenance service shop. According to this, an on-site service can be requested while the vehicle 1 is evacuated to a safe place. Further, after Step ST10, the air pressure management device 10 once terminates the process, but repeatedly performs the processes from Step ST1 described above routinely. The processes are repeated routinely from Step ST1 described above.

Note that, in the embodiment described above, the configuration in which the first determination unit 22 determines whether the air pressure decrease rate calculated by the air pressure decrease rate calculation unit 18 is larger than the air pressure decrease rate threshold value has been described, but the second determination unit 23 may determine the presence of an abnormality in air pressure of the set of tires 2 that have been paired in advance, subsequent to the determination by the first determination unit 22. According to this configuration, since the presence of an abnormality in the air pressure of the set of tires 2 is determined based on the deviation of the air pressure decrease rate of the set of paired tires 2, for example, the presence of an abnormality in the air pressure of the tire 2 can be accurately determined even in an initial stage of a failure, and combination of the determination by the second determination unit 23 with the determination by the first determination unit 22 allows accurately and early determining the presence of an abnormality in air pressure of the tire 2.

Figure 8:
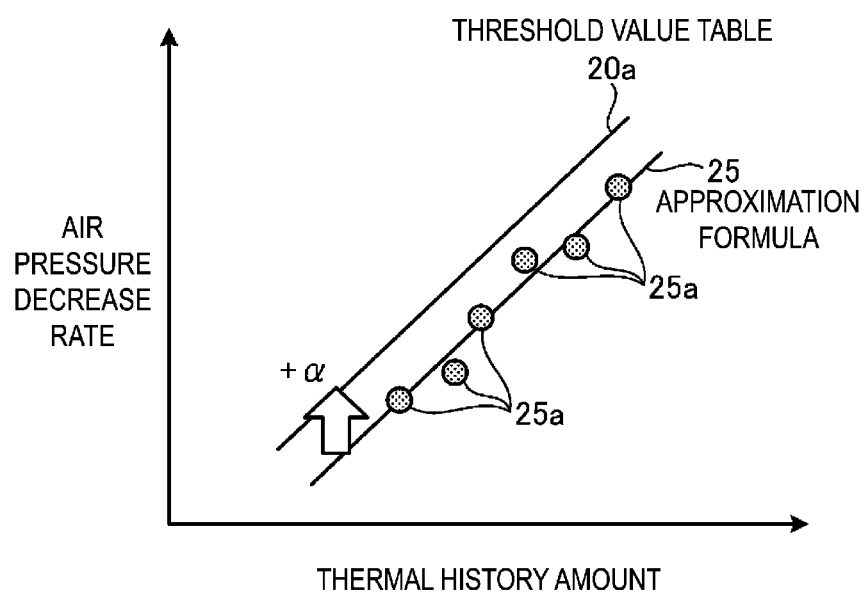
FIG. 8 is a diagram describing an operation of generating a threshold value table based on information relating to the thermal history amount and the air pressure decrease rate.

Next, the operation of updating the threshold value table 20a of the air pressure decrease rate threshold value setting unit 20 will be described. FIG. 8 is a diagram describing an operation of generating the threshold value table based on information relating to the thermal history amount and the air pressure decrease rate. The threshold value table 20a is preferably updated routinely, for example, at a timing of operating an engine of the vehicle 1. In the present embodiment, the table update unit 21 acquires information 25a relating to the thermal history amount and the air pressure decrease rate of the tire having the same specifications (model number and size) of the tire 2 of own vehicle from the database in the server device 30. As illustrated in FIG. 8, the table update unit 21 creates an approximation formula 25 indicating a relationship between the thermal history amount and the air pressure decrease rate from a plurality of pieces of the acquired information 25a. This approximation formula is a linear expression in the example of FIG. 8. Also, this approximation formula may be created using, for example, a method of least squares. Then, the table update unit 21 generates and updates the threshold value table 20a indicating the relationship between the thermal history amount and the air pressure decrease rate threshold value by adding a predetermined margin a to this approximation formula 25. This predetermined margin a is a constant value added in an axial direction of the air pressure decrease rate to the approximation formula 25.

According to this configuration, the threshold value table 20a is updated based on the information relating to the thermal history amount and the air pressure decrease rate acquired from the database, and thus, the determination accuracy of whether the air pressure of the tire 2 is abnormal can be increased, and displaying the air pressure abnormality on the display unit 14 allows early notification to the driver. In FIG. 8, while the information 25a relating to the thermal history amount and the air pressure decrease rate is acquired from the database in the server device 30 to create the approximation formula 25, the information relating to the thermal history amount and the air pressure decrease rate of the tire 2 accumulated in own vehicle by continuous use may be acquired, and the threshold value table 20a may be updated based on the information relating to the thermal history amount and the air pressure decrease rate.

Figure 9:
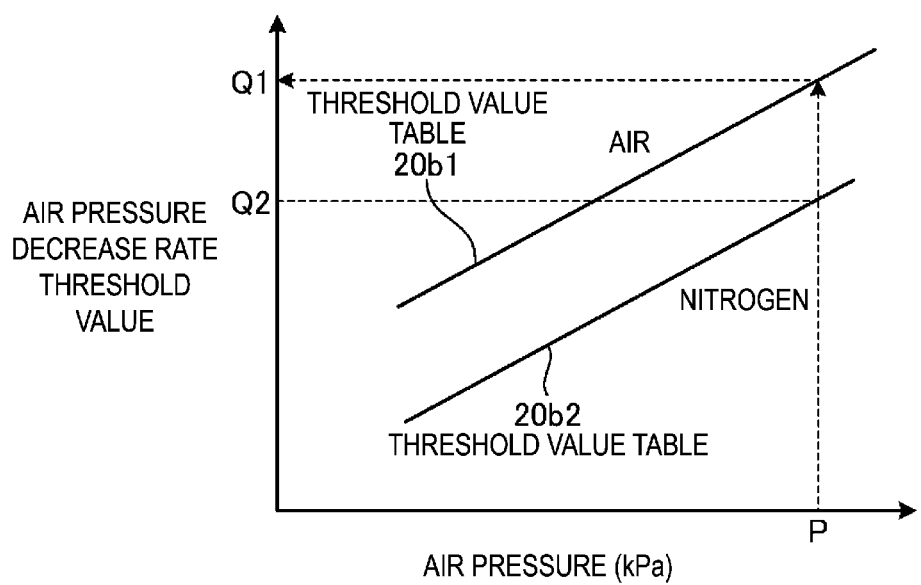
FIG. 9 is a schematic diagram of a threshold value table illustrating a relationship between the air pressure and the air pressure decrease rate threshold value.

In the present embodiment, the thermal history amount has been exemplified as a predetermined physical quantity related to the tire, but the present embodiment is not limited to this, and the air pressure and the temperature of the tire can also be used as a predetermined physical quantity related to the tire. FIG. 9 is a schematic diagram of a threshold value table illustrating the relationship between the air pressure and the air pressure decrease rate threshold value. In this configuration, as illustrated in FIG. 9, a threshold value table is provided for each kind of gas (air, nitrogen) sealed in the tire 2. Therefore, it is possible to change the threshold value table used depending on the sealed gas, and it is possible to accurately determine the presence of an abnormality in the air pressure of the tire 2. FIG. 9 illustrates a threshold value table 20b1 indicating the relationship between the air pressure and the air pressure decrease rate threshold value of the air in the normal composition and a threshold value table 20b2 indicating the relationship between the air pressure and the air pressure decrease rate threshold value of nitrogen, but the configuration is not limited to this, and another gas may be contained.

Each of these threshold value tables 20b1, 20b2 defines the air pressure decrease rate threshold value associated with the air pressure. As the air pressure in this case, a momentary value may be used, but the average value of air pressure measured for a predetermined period (for example, one or more days) is preferably used.

In this configuration, with reference to the threshold value tables 20b1, 20b2, the set air pressure decrease rate threshold value can be changed according to the average air pressure for the predetermined period, and thus the presence of an abnormality in air pressure of the tire 2 can be accurately determined.

Although not illustrated, a configuration may include a threshold value table indicating the relationship between the temperature of the tire as a physical quantity and the air pressure decrease rate threshold value. As the temperature in this case as well, a momentary value may be used, but the average value of the temperature of the tire measured for a predetermined period (for example, one or more days) is preferably used. In this configuration, with reference to the threshold value table (not illustrated), the set air pressure decrease rate threshold value can be changed according to the measured temperature, and thus the presence of an abnormality in air pressure of the tire 2 can be accurately determined.

As described above, the air pressure management device 10 according to the present embodiment includes the temperature conversion air pressure calculation unit 17, the air pressure decrease rate calculation unit 18, the air pressure decrease rate threshold value setting unit 20, and the first determination unit 22. The temperature conversion air pressure calculation unit 17 calculates the temperature conversion air pressure of the tire 2 based on the acquired temperature and air pressure of the tire 2. The air pressure decrease rate calculation unit 18 calculates the air pressure decrease rate from the amount of change in the temperature conversion air pressure for a predetermined period. The air pressure decrease rate indicates the declining trend of the air pressure of the tire 2. The air pressure decrease rate threshold value setting unit 20 sets the air pressure decrease rate threshold value corresponding to the acquired thermal history amount using the threshold value table 20a. The threshold value table 20a specifies the air pressure decrease rate threshold value associated with the thermal history amount regarding the tire 2. The first determination unit 22 determines whether the air pressure of the tire 2 is abnormal based on the calculated air pressure decrease rate and the set air pressure decrease rate threshold value. Thus, the first determination unit 22 determines whether the air pressure of the tire 2 is abnormal based on the air pressure decrease rate threshold value set corresponding to the current thermal history amount and the air pressure decrease rate, and therefore the presence of an abnormality in the air pressure of the tire 2 can be accurately determined.

In addition, according to the present embodiment, as the physical quantity, any one of the thermal history amount, the temperature, and the air pressure of the tire 2 is used. This allows accurately determining the presence of an abnormality in the air pressure of the tire 2.

In addition, according to the present embodiment, the air pressure decrease rate calculation unit 18 calculates the respective air pressure decrease rates of a set of the tires 2 paired based on the wheel positions of the vehicle on which the tires 2 are mounted. The second determination unit 23 that determines whether an air pressure of one of the tires 2 is abnormal among the set of tires 2 based on the deviation of the respective air pressure decrease rates is provided. Therefore, for example, the presence of an abnormality in the air pressure of the tire 2 can be accurately determined even in an initial stage of a failure. Accordingly, by combining the determination by the second determination unit 23 with the determination by the first determination unit 22, it is possible to accurately determine the presence of an abnormality in the air pressure of the tire 2 early.

Additionally, according to the present embodiment, the table update unit 21 that acquires the thermal history amount and the air pressure decrease rate of the tire 2 is provided. The table update unit 21 updates the threshold value table 20a based on the acquired thermal history amount and air pressure decrease rate. Therefore, by updating the threshold value table 20a to the latest one as needed, the presence of an abnormality in air pressure of the tire 2 can be determined accurately.

In addition, according to the present embodiment, the table update unit 21 acquires the thermal history amount and the air pressure decrease rate of the tire 2 having same specifications of the tire 2 accumulated in the database in the server device 30. Thus, a large amount of data can be used, and the presence of an abnormality in air pressure of the tire 2 can be determined accurately.

In addition, according to the present embodiment, the display unit 14 is provided. The display unit 14 is configured such that when the first determination unit 22 determines that the air pressure of the tire 2 is abnormal and in a case where the tire 2 is continuously used at the calculated air pressure decrease rate, the display unit 14 notifies the time until the air pressure of the tire decreases to the limit air pressure. Thus, the driver (user) can retract to a safe location or move to the maintenance service shop within the time.

An air pressure management method according to the present embodiment includes: Step ST4 of calculating the temperature conversion air pressure of the tire based on the acquired temperature and air pressure of the tire; ST5 of calculating the air pressure decrease rate from the amount of change in the temperature conversion air pressure for a predetermined period; ST3 of setting an air pressure decrease rate threshold value corresponding to an acquired thermal history amount using the threshold value table 20a, the threshold value table 20a specifying the air pressure decrease rate threshold value associated with the thermal history amount regarding the tire 2; and ST6 of determining whether the air pressure of the tire 2 is abnormal based on the calculated air pressure decrease rate and the set air pressure decrease rate threshold value. Thus, the presence of an abnormality in air pressure of the tire 2 can be determined accurately.

An air pressure management program according to the present embodiment causes the air pressure management device 10 to execute: Step ST4 of calculating the temperature conversion air pressure of the tire based on the acquired temperature and air pressure of the tire 2; ST5 of calculating the air pressure decrease rate from the amount of change in the temperature conversion air pressure for a predetermined period; ST3 of setting the air pressure decrease rate threshold value corresponding to the acquired thermal history amount using the threshold value table 20a, the threshold value table 20a specifying the air pressure decrease rate threshold value associated with the thermal history amount regarding the tire 2; and ST6 of determining whether the air pressure of the tire 2 is abnormal based on the calculated air pressure decrease rate and the set air pressure decrease rate threshold value. Thus, the presence of an abnormality in air pressure of the tire 2 can be determined accurately.

While the embodiments of the present technology have been described above, the present technology is not limited to the embodiments described above.

The invention claimed is:

1. An air pressure management device, comprising:
   a temperature conversion air pressure calculation unit that calculates a temperature conversion air pressure of a tire based on acquired temperature and air pressure of the tire;
   an air pressure decrease rate calculation unit that calculates an air pressure decrease rate from an amount of change in the temperature conversion air pressure for a predetermined period, the air pressure decrease rate indicating a declining trend of the air pressure of the tire;
   an air pressure decrease rate threshold value setting unit that sets an air pressure decrease rate threshold value corresponding to an acquired physical quantity using a threshold value table, the threshold value table specifying the air pressure decrease rate threshold value associated with the predetermined physical quantity regarding the tire; and
   a first determination unit that determines whether the air pressure of the tire is abnormal based on the calculated air pressure decrease rate and the set air pressure decrease rate threshold value.

2. The air pressure management device according to claim 1, wherein
   the physical quantity is any one of a thermal history amount, the temperature, and the air pressure of the tire.

3. The air pressure management device according to claim 2, wherein
   the air pressure decrease rate calculation unit calculates the respective air pressure decrease rates of a set of the tires paired based on wheel positions of a vehicle on which the tires are mounted, and
   the air pressure management device includes a second determination unit that determines whether an air pressure of one of the tires is abnormal among the set of tires based on a deviation of the respective air pressure decrease rates.

4. The air pressure management device according to claim 3, comprising
   a table update unit that acquires the physical quantity and the air pressure decrease rate of the tire, the table update unit updating the threshold value table based on the acquired physical quantity and air pressure decrease rate.

5. The air pressure management device according to claim 4, wherein
   the table update unit acquires the physical quantity and the air pressure decrease rate of a tire having same specifications of the tire accumulated in an external device.

6. The air pressure management device according to claim 5, comprising
   a notification unit configured such that when the first determination unit determines that the air pressure of the tire is abnormal and in a case where the tire is continuously used at the calculated air pressure decrease rate, the notification unit notifies a time until the air pressure of the tire decreases to a limit air pressure.

7. The air pressure management device according to claim 1, wherein
   the air pressure decrease rate calculation unit calculates the respective air pressure decrease rates of a set of the tires paired based on wheel positions of a vehicle on which the tires are mounted, and
   the air pressure management device includes a second determination unit that determines whether an air pressure of one of the tires is abnormal among the set of tires based on a deviation of the respective air pressure decrease rates.

8. The air pressure management device according to claim 1, comprising
   a table update unit that acquires the physical quantity and the air pressure decrease rate of the tire, the table update unit updating the threshold value table based on the acquired physical quantity and air pressure decrease rate.

9. The air pressure management device according to claim 8, wherein
   the table update unit acquires the physical quantity and the air pressure decrease rate of a tire having same specifications of the tire accumulated in an external device.

10. The air pressure management device according to claim 1, comprising
    a notification unit configured such that when the first determination unit determines that the air pressure of the tire is abnormal and in a case where the tire is continuously used at the calculated air pressure decrease rate, the notification unit notifies a time until the air pressure of the tire decreases to a limit air pressure.

11. An air pressure management method, comprising:
    calculating a temperature conversion air pressure of a tire based on acquired temperature and air pressure of the tire;
    calculating an air pressure decrease rate from an amount of change in the temperature conversion air pressure for a predetermined period;
    setting an air pressure decrease rate threshold value corresponding to an acquired physical quantity using a threshold value table, the threshold value table specifying the air pressure decrease rate threshold value associated with the predetermined physical quantity regarding the tire; and
    determining whether the air pressure of the tire is abnormal based on the calculated air pressure decrease rate and the set air pressure decrease rate threshold value.

12. An air pressure management program that causes an air pressure management device to execute:
- calculating a temperature conversion air pressure of a tire based on acquired temperature and air pressure of the tire;
- calculating an air pressure decrease rate from an amount of change in the temperature conversion air pressure for a predetermined period;
- setting an air pressure decrease rate threshold value corresponding to an acquired physical quantity using a threshold value table, the threshold value table specifying the air pressure decrease rate threshold value associated with the predetermined physical quantity regarding the tire; and
- determining whether the air pressure of the tire is abnormal based on the calculated air pressure decrease rate and the set air pressure decrease rate threshold value.

* * * * *